United States Patent [19]

Koskela

[11] Patent Number: 4,562,828

[45] Date of Patent: Jan. 7, 1986

[54] SOLAR WATER HEATING SYSTEM AND HEAT EXCHANGER FOR USE WITH EXISTING HOT WATER SYSTEMS

[76] Inventor: Marvin O. Koskela, 4222 E. Calle Redonda, Phoenix, Ariz. 85018

[21] Appl. No.: 336,663

[22] Filed: Jan. 4, 1982

[51] Int. Cl.⁴ ............................................. F24J 3/02
[52] U.S. Cl. .................................. 126/435; 126/422; 126/437
[58] Field of Search ............. 126/437, 435, 422, 432; 165/48 R, 157, 163; 237/56

[56] References Cited

U.S. PATENT DOCUMENTS

| | | | |
|---|---|---|---|
| 3,903,700 | 9/1975 | Glickman | 126/435 X |
| 4,126,122 | 11/1978 | Bross | 126/420 |
| 4,130,110 | 12/1978 | Bottum | 126/435 X |
| 4,153,043 | 5/1979 | Gollsby | 126/271 |
| 4,157,706 | 6/1979 | Gaskill | 126/435 |
| 4,207,866 | 6/1980 | Boyd | 126/420 |
| 4,254,740 | 3/1981 | Lowe et al. | 126/435 X |
| 4,257,479 | 3/1981 | Newton | 126/435 X |
| 4,269,167 | 5/1981 | Embree | 126/420 |
| 4,285,334 | 8/1981 | Collins | 126/435 X |
| 4,314,547 | 2/1982 | Walsh | 126/435 X |
| 4,324,228 | 4/1982 | Shippee | 126/435 X |
| 4,397,294 | 8/1983 | Mancebo | 126/437 X |

*Primary Examiner*—Larry Jones
*Attorney, Agent, or Firm*—Cates & Roediger

[57] ABSTRACT

In a solar water system including a solar collector, a small independent heat exchanger having three of the four ports located at the top with two ports being coaxial is provided for use with existing hot water heaters. The exchanger includes automatic drainback during freezing conditions.

6 Claims, 3 Drawing Figures

SOLAR WATER HEATING SYSTEM AND HEAT EXCHANGER FOR USE WITH EXISTING HOT WATER SYSTEMS

BACKGROUND OF THE INVENTION

The world has become increasingly aware of the scarcity of fuel including, particularly, the fossil fuels, gas and oil. At the same time the world has become increasingly aware of the energy available from the sun, particularly, in those areas where there is a high percentage of days throughout the year when the sun is available for heating purposes and for other energy available in the sun's spectrum. For these reasons, a great deal of attention has been paid to the utilization of solar energy for heating systems and, particularly, for water heating systems.

In those instances wherein it is desired to use the hot water directly, the time interval between the collection of solar energy and its use in the form of hot water is relatively short. In the instances wherein the energy is intended to be used for space heating, as for example, heating of homes, the heating of hot water through the use of solar energy provides a storage means from which the heat can be later extracted for use in space heating.

Solar heating systems can be designed from the ground up so to speak, but frequently the system consists of applying a solar collector, or solar heating unit, to an already existing hot water tank. Typically, this is the case in home systems. Here the federal government regulations require that the solar heating unit be utilized in connection with an existing hot water heater which has its own heating source whether it be electric, gas or oil. Such systems include the solar collecting unit operating in association with a hot water heater or the solar heating unit operates in connection with a heat exchanger that is connected to the hot water heater. The heat exchanger may be a separate unit or it may be part of a larger water tank system, but is necessary in solar heating systems wherein the existing hot water heater is going to continue to be utilized in the water system.

Also, the liquid flowing through the solar collector which is usually mounted on a roof of a house, has water flowing through it that is heated in the process of being exposed to the sun's radiation. When the ambient temperature drops below freezing, the water circulating through the solar collector unit is apt to freeze and in so doing may burst the pipes in the solar collector. This would incapacitate the system and render substantial damage. Systems for preventing this are known to the art and usually involve the drainage of the solar collector unit, or the circulation therethrough of warm water from the hot water heater itself. Such known systems tend to be large and bulky, complicated and somewhat ineffective in operation. It goes virtually without saying that the possibility of freezing of a solar water heating system is an intolerable situation.

Accordingly, it is an object of the invention to provide an improved solar hot water heating system eliminating the objections of prior art devices.

It is a further object of the invention to provide an improved solar heating system including an enhanced efficiency heat exchanger therein.

Another object is to provide a solar heating system containing a heat exchanger having storage capability for automatic drain back to be utilized with an existing hot water heater.

It is a further object of the invention to provide an improved heat exchanging unit which is small in size and efficient in operation for use in connection with a solar heating system including a solar collector and a conventional water heater.

SUMMARY OF THE INVENTION

In carrying out the invention according to one form there is provided a solar water heating system of the type wherein solar collecting means and heat exchanger means are utilized in combination with a conventional water heater.

The system includes solar collecting means containing a fluid flow path therein and heat exchange tank means having a first input port located at the top thereof and a first output port with the ports being in communication with the flow path of the solar collecting means. The tank means is provided with a second input port and a second output port both located at the top thereof. Also, the system includes pump means in communication with the collecting means and exchange tank means to circulate liquid therebetween and control means coupled to the pump means to control the operation thereof.

The tank means has a partially filled liquid level during circulation and contains heat exchanger means therein extending below the partially filled level and coupled to the second input and output ports. The system further includes means for coupling the second input and output ports at the top of the tank means to the water heater-storage unit to provide a fluid flow path between the heat exchanger and the conventional water heater-storage unit. In addition, vacuum break means is contained at the first input port within the exchange tank means.

The system provides an improved independent heat exchanger with reservoir capacity for automatic drainback to be utilized in combination with solar collecting means and already installed water heaters. In order to facilitate installation in existing buildings, three of the four ports extending into the heat exchange tank are located at the top thereof. In a preferred embodiment, the first input port and second output port comprise substantially coaxial fluid conduit segments to provide improved heat transfer efficiency and further reduce the installation area needed for the system.

Further features and advantages of the invention will become more readily apparent from the following detailed description of a preferred embodiment of the invention when taken in conjunction with the accompanying drawing.

DESCRIPTION OF THE PREFERRED EMBODIMENTS

Figure 1:
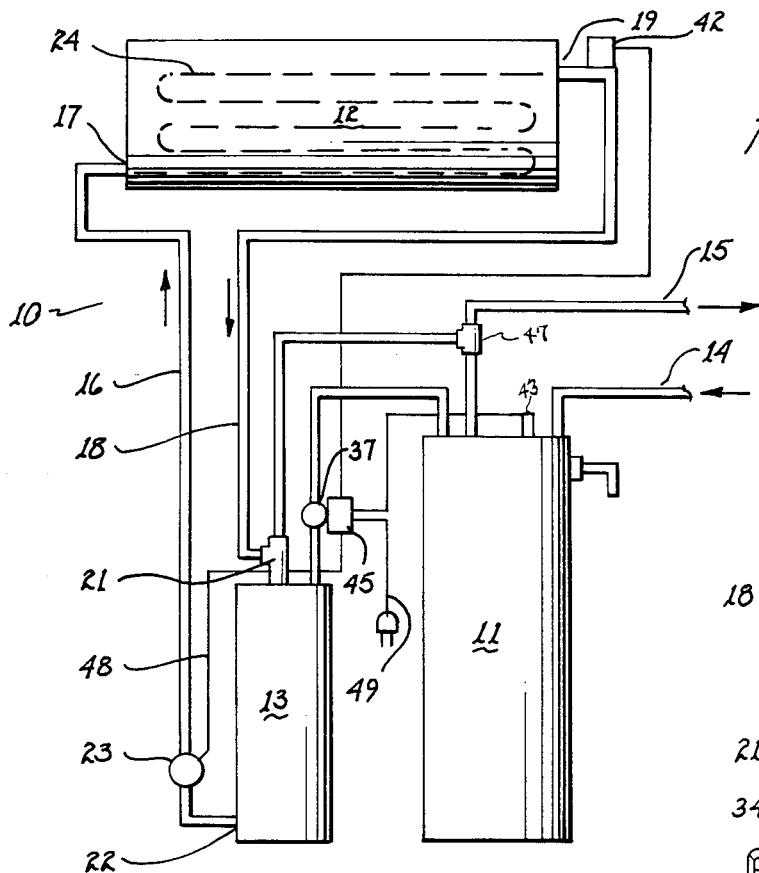
FIG. 1 is a diagrammatic view of a solar water heating system according to the invention.

Referring to the drawings, the invention is shown embodied in a system 10 (FIG. 1) which includes an ordinary home water heater 11, a solar collector unit 12 and an independent heat exchanger 13 connected together and controlled as will be more particularly described.

The water heater 11 may be of any ordinary well-known variety heated by electricity, gas, oil, or the like, to which cold water is supplied through an appropriate pipe 14 and from which hot water is taken by an appropriate pipe or conduit 15. The solar collector unit 12 may be of any well-known variety such, for example, as the units manufactured by the Colt, Inc. Cold water or other heating liquid is supplied through pipe or conduit 16 to the inlet 17 of the collector unit 12, and the heated water or other liquid is taken from the solar collector unit 12 through a pipe or conduit 18 at the heated liquid outlet 19, and is supplied to the angular connection 21 located at the top of the separate, or independent, heat exchanger 13 shown in greater detail in FIG. 2. Cooled heating liquid from the heat exchanger 13 flows out at outlet 22, and by means of the electrically operated pump 23 is supplied through pipe or conduit 16 to the input 17 of the solar collector unit. Circulation of heating fluid, which may be water, usually, takes place through suitable passages in the collector 12, these being shown diagrammatically by the dotted lines 24.

Figure 2:
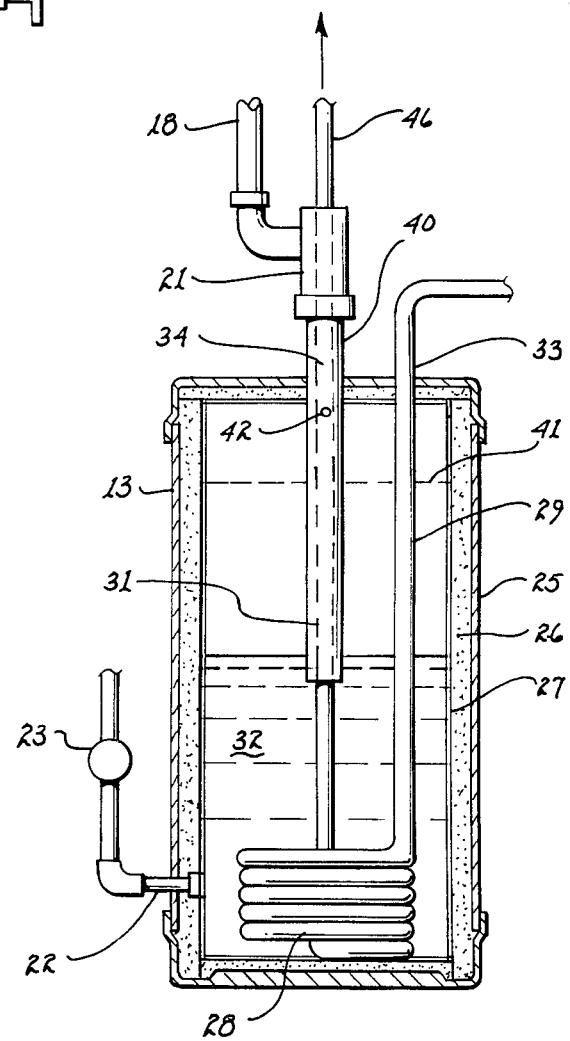
FIGS. 2 and 3 are sectional views on an enlarged scale of two embodiments of the heat exchanger unit forming part of the present invention.

Referring more particularly to FIG. 2, the heat exchanger 13 is shown as comprising an outer wall 25 including end caps and insulated in any usual manner as by a layer of fiber glass insulation 26, an inner wall 27 suitably supported inside of the outer tank and a heat transfer coil 28 having an inlet conduit 29 and an outlet conduit 31. The heat exchanger coil 28 may be, conveniently, in the form of a spiral and occupies a portion of the fluid reservoir region 32 of the heat exchange tank defined by inner wall 27. The inlet 29 conduit of the spiral heat exchanger coil 28 communicates through conduit 46, pump 37 and inlet port 33 located in the top of the exchange tank with the hot water heater tank 11 as may be seen in FIG. 1. The outlet conduit 31 of the spiral heating coil 28 is in communication with the conduit 15 which supplies hot water to the user from the hot water tank 11 via outlet port 34 shown by dashed lines in FIG. 2 and connecting conduit 46. The spiral heat exchanger coil 28 is coupled to the hot water tank 11 through the corresponding ports in the heat exchanger 13 and the activation of pump 37 causes the flow of water therethrough. User demand will result in the flow of water through tee connection 47 via conduit 15 to the subsequent utilization system.

The lower end of the heat exchanger 13 communicates at the first output port 22 with the solar collector unit 12. At the upper end thereof, a large diameter conduit connected to angular connection 21 provides the first input port 40 through the top of the exchanger. The port 40 is coupled to the connection 21 which communicates with the pipe or conduit 18 also connected to the outlet end of the solar collector 12.

During the operation, heated water from the solar collector flows downwardly through conduit 18 and through the connection 21 and first input port 40 into the reservoir 32. The inner portion of input port 40 extends below the operating fluid level as shown to reduce the noise of fluid flow in the system. The heated water comes into contact with the turns of the heater exchanger coil 28 causing the water therein to become heated and it circulates into the hot water tank as already described. The heat transfer fluid filling up the space 32 in the exchanger tank flows out of the tank through the first output port 22. The pump 23 circulates the heating liquid from port 22 and through the conduit 16 to the solar collector inlet 17 as already described. When the system is functioning and the pump 23 is operating, the liquid in the reservoir 32 is adequate to supply the requirements of the pump 23. During this time, the liquid inside of the inner tank is at a level shown approximately by the water-fill line in FIG. 2.

When the system stops functioning, as for example when the temperature drops at night and in order to prevent freezing of the heating liquid (water) in the solar collector 12, the heating liquid in the solar collector drains back through conduit 16 and thus through pump 23 and conduit 22 into the interior of the tank. The liquid level under this condition rises about to that shown by the line 41. The space inside of the heat exchange tank 18 is sufficiently large so that all of the heating liquid in the solar collector 17 can drain back into the interior of the tank so that no heating liquid is in the solar collector and thus all danger of difficulty of freezing of the heating liquid is removed.

The drain back process under the conditions described does not give rise in the present invention to the creation of a vacuum in the system which could prevent the drain out of the solar collector. To insure drainback an air or other gaseous pathway is provided from the interior of the heat exchanger 13 to the solar collector by the provision of aperture 42 located in the inner segment of input port 40. Referring to FIG. 2, it will be noted that inside the tank aperture 42 is located above the liquid-fill level 41 so that air is available at aperture 42 under different conditions. Thus, there is an air pathway from the interior of the exchanger tank to the solar collector and no vacuum will form to prevent the drain back of liquid into the heat exchanger.

When the system is functioning and hot water is flowing downwardly through conduit 18 from the solar collector, the liquid level in the tank rises to the level shown approximately in FIG. 2. The level is selected so that the hot water surrounds essentially all of the turns of the heat exchanger coil 28 and thus provides for maximum heating effect to the hot water tank 11. Other liquid levels may be chosen.

To turn the system on and off during appropriate temperature conditions, temperature sensors 42 and 43 are attached or associated, respectively, with the outlet 19 of the solar 12 and the water temperature in the water heater 11. The temperature sensors 42 and 43 are connected, respectively, by means of conductors as shown to a differential controller 45, shown schematically, from which a conductor 48 extends to the motor of pump 23. The differential controller is connected by a conductor 49 to an ordinary wall plug which may be plugged into a common ordinary house lighting circuit. The temperature sensors 42, 43, the differential controller 45 and the circuits connected thereto are standard available items from several sources and any may be utilized. One form is available from a company known as Heliotrop General and the components are sold under that name of "Delta T".

For ordinary operating conditions, when the temperature at sensor 42 reaches a level of about 15 degrees higher than the temperature at sensor 43, the pump 23 is caused to turn on. This causes heated water from the solar collector 12 to circulate through the system as described, thereby resulting in water in the hot water heater 11 being heated. During conditions of no sunlight such as at night or on cold overcast days or at any time when the weather is cold such that freezing of the water in the solar collector might take place, the temperature at sensor 42 reaching a level of only five degrees or so above the temperature level of sensor 43, the pump 23 is caused to turn off. Under this condition the water or heating fluid in the solar collector 12 drains back through conduit 16 by virtue of the mechanism and structure as already described. Thus, the solar collector becoome empty of heating water and no freezing can take place. Of course the water in the conduits 18 and 16 likewise drains down into the interior of the heat exchanger 13 raising the water level therein to the approximate level of the dashed line 41 in FIG. 2.

The heat exchanger 13 is of relatively small size and contains two coaxial ports at the top thereof to both facilitate installation in existing buildings and to enhance the heat transfer characteristics. It is to be noted that the heated water from the collector enters the exchange tank from conduit 18 through an input port that surrounds the output port for heated water flowing to water heater 11 through conduit 46. Thus, the heated input from the solar collector 12 is in heat transfer relationship with the water being returned through conduit 46 and connection 47 to either the utilization means or the hot water unit 11. This system is accommodated in the ordinary existing home water heating installation without requiring the water heater itself to be replaced. Typically, the heat exchanger 13 may have a diameter of about ten inches and a height of about thirty-four inches excluding the thickness of the insulation surrounding it. In the effort to conserve energy one or more inches of insulation is normally provided in the heat exchanger 13.

Figure 3:
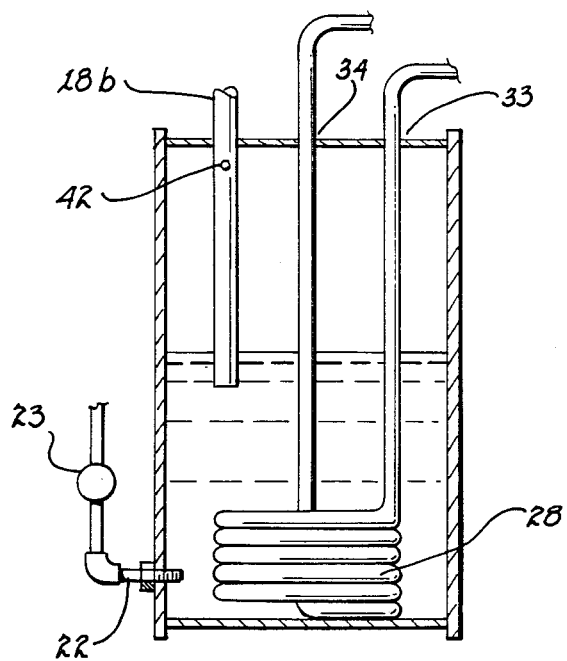

Other ways of breaking any vacuum that might exist in the lines during drain back of the water from the solar collector 12 may be used. Similarly, variations may be made in the heat exchanger 13. One form of modified structure containing the three top ports to facilitate installation in restricted space applications is shown in FIG. 3 and will now be described. In FIG. 3 wherein the parts are essentially identical to those shown in FIGS. 1 and 2 the same reference characters will be used.

The essential difference between the structures as illustrated in FIG. 3 and FIG. 2 is that the heat exchanger 13 input port for the hot water from the solar collector is not coaxial with the output port for heated water being returned to heater 11. As shown, conduit 18b extends directly into the tank and connection 21 is not utilized. While this embodiment provides the advantages of three top end connections to reduce the required installation space, compatibility with existing hot water heaters and lower cost due to the elimination of the tee connection and alignment steps during manufacture, the benefits of the improved heat transfer resulting from the coaxial port structure of FIG. 2 are not obtained. The system is not changed in other respects by the use of the embodiment of FIG. 3.

In the version shown in FIG. 3 when the system is functioning to provide heating water to the heat exchanger 13 the air pathway is completed so that any vacuum may be broken during the drain back by a vent or opening 42 which communicates with the air space above the liquid level in the tank and, thus, through the input port pipe or conduit 18. Since there is an air supply available through pipe 18 to the outlet 19 of solar collector 12 there will be no vacuum formation therein and during the appropriate conditions, as previously described, the water in the solar collector 12 and in the conduits 16 and 18 will drain back into the heat exchanger 13.

While two forms of the invention have been shown it will be apparent that other forms may be made coming within the spirit and scope of the inventive concept.

I claim:

1. A solar water heating system which comprises:
   (a) solar collector means containing a fluid flow path therein;
   (b) water storage means for containing a reservoir of water and adapted to provide water to an external circuit;
   (c) a heat transfer circuit coupled to said water storage means;
   (d) heat exchanger means including a top surface and having a first input port located at said top surface and a first output port, both of said first ports being coupled to the fluid flow path of the collector means, said heat exchanger means providing a reservoir therein for at least a portion of the fluid contained in said flow path, said heat exchanger means further including a second input port and a second output port, each of said second ports being located at said top surface and being coupled to said heat transfer circuit with at least a portion of said heat transfer circuit residing within the reservoir in the heat exchanger means, said first input port and second output port being coaxially located on said heat exchanger means to enhance heat transfer between said fluid circuits; and
   (e) vacuum break means located within said heat exchanger means proximate to said first input port for supplying air to the solar collector means upon the cessation of flow in the fluid flow path.

2. The system of claim 1 wherein said first input port is larger in diameter than said second output port.

3. The system of claim 2 wherein said first input port and said second output port are comprised of substantially coaxial fluid conduit segments extending into the heat exchanger means, each segment having both inner and outer extending portions.

4. The system of claim 3 wherein said vacuum break means includes an aperture located in the inner portion of the first input port.

5. The system of claim 4 wherein the aperture in said inner portion is located above the fluid level within said heat exchanger during fluid flow through the path of said collector means.

6. The system of claim 5 wherein the fluid heat transfer circuit comprises a closed loop fluid circuit with the second input and second output ports being located at the top of the heat exchanger means.

* * * * *